(12) United States Patent
Muderlak

(10) Patent No.: US 7,255,325 B2
(45) Date of Patent: Aug. 14, 2007

(54) IN-WALL SENSOR ASSEMBLY

(75) Inventor: Kenneth J. Muderlak, Milwaukee, WI (US)

(73) Assignee: Technical Concepts, LLC, Mundelein, IL (US)

( * ) Notice: Subject to any disclaimer, the term of this patent is extended or adjusted under 35 U.S.C. 154(b) by 0 days.

(21) Appl. No.: 11/111,003

(22) Filed: Apr. 21, 2005

(65) Prior Publication Data

US 2006/0237673 A1    Oct. 26, 2006

(51) Int. Cl.
*H02G 3/12* (2006.01)
(52) U.S. Cl. .................................. 251/129.04
(58) Field of Classification Search ............ 251/129.04
See application file for complete search history.

(56) References Cited

U.S. PATENT DOCUMENTS

| | | |
|---|---|---|
| 1,030,858 A | 7/1912 | Ames |
| 1,273,986 A | 7/1918 | Azadian |
| 2,320,400 A | 6/1943 | Bedell |
| 2,357,787 A | 9/1944 | Windsheimer |
| 2,401,948 A | 6/1946 | Loy |
| 2,491,742 A | 12/1949 | Lein |
| 2,776,774 A | 1/1957 | Valelunga |
| 2,801,019 A | 7/1957 | De Ronck et al. |
| 2,875,914 A | 3/1959 | Buckels |
| 2,908,416 A | 10/1959 | Rudolph et al. |
| 2,970,713 A | 2/1961 | Kellberg |
| 2,978,135 A | 4/1961 | Furnish |
| 3,027,416 A | 3/1962 | Kissel |
| 3,052,369 A | 9/1962 | Taibi |
| 3,153,118 A | 10/1964 | Clark |
| 3,187,294 A | 6/1965 | Murray et al. |
| 3,614,144 A | 10/1971 | Hodges |
| 3,957,336 A | 5/1976 | Bromberg |
| 3,966,152 A | 6/1976 | Bromberg |
| 4,297,525 A | 10/1981 | Bowden, Jr. |
| 4,304,957 A | 12/1981 | Slater et al. |
| 4,328,903 A | 5/1982 | Baars |
| 4,408,696 A | 10/1983 | Crosson |

(Continued)

FOREIGN PATENT DOCUMENTS

EP        0 516 008        5/1992

OTHER PUBLICATIONS

PCT International Search Report/Written Opinion of the International Searching Authority (the European Patent Office) regarding Application No. PCT/US2006/008640, dated Nov. 7, 2006, 19 pages.

*Primary Examiner*—J. Casimer Jacyna
(74) *Attorney, Agent, or Firm*—Brinks Hofer Gilson & Lione

(57) ABSTRACT

A sensor assembly which is located within a wall is disclosed. The sensor assembly is typically attached to a unit for automatically flushing a toilet or urinal. The sensor assembly includes a housing, a flange, a fastening means, a face plate, a power source, and a sensor. The housing is located in a hole in a wall and fastened by flange and fastening means. The housing will hold the power source and the sensor, which will be enclosed by the face plate. A key which fits in indentations in the face plate and is used to attach and remove the face plate is disclosed. Finally, a method of installing the sensor assembly is disclosed.

22 Claims, 7 Drawing Sheets

U.S. PATENT DOCUMENTS

| | | |
|---|---|---|
| 4,742,583 A | 5/1988 | Yoshida et al. |
| 5,062,453 A | 11/1991 | Saadi et al. |
| 5,221,814 A | 6/1993 | Colbaugh et al. |
| 5,313,673 A | 5/1994 | Saadi et al. |
| 5,341,839 A | 8/1994 | Kobayashi et al. |
| 5,362,026 A | 11/1994 | Kobayashi et al. |
| 5,398,348 A | 3/1995 | Tashiro et al. |
| 5,434,359 A | 7/1995 | Schnell |
| 5,588,636 A | 12/1996 | Eichholz et al. |
| 5,819,336 A | 10/1998 | Gilliam et al. |
| 5,901,384 A | 5/1999 | Sim |
| 5,943,712 A | 8/1999 | Van Marcke |
| 5,984,262 A | 11/1999 | Parsons et al. |
| 5,988,588 A | 11/1999 | Allen et al. |
| 6,056,261 A | 5/2000 | Aparicio et al. |
| 6,067,673 A | 5/2000 | Paese et al. |
| 6,102,360 A | 8/2000 | Clegg et al. |
| 6,170,685 B1 | 1/2001 | Currier |
| 6,202,227 B1 | 3/2001 | Gurowitz |
| 6,206,340 B1 | 3/2001 | Paese et al. |
| 6,328,177 B2 | 12/2001 | Goudal |
| 6,388,609 B2 | 5/2002 | Paese et al. |
| 6,568,655 B2 | 5/2003 | Paese et al. |

IN-WALL SENSOR ASSEMBLY

BACKGROUND

Restrooms can be breeding grounds for disease-spreading bacteria. As a result, there is a growing desire to develop systems for restrooms that eliminate human contact with restroom surfaces. Additionally, water conservation concerns have created a desire to control water usage by preventing excessive flushing.

Many present toilets and urinals are operated by a manual flush handle. The user operates the toilet or urinal by displacing the position of the flush handle. The manual flush handle controls the flow of water into the toilet or urinal device. Manual flush handles present several problems. The problems may include a reluctance to touch the flush handle due to possible bacteria. As a result, the toilet or urinal may remain unflushed, leaving waste in the toilet or urinal, creating the unsanitary conditions.

In addition, a user can often hold the manual flush handle in an open position for an excessive time period. Maintaining the handle in an open position may waste water, and lead to additional costs or flooding. As a result, devices for automatically controlling the flushing of toilets or urinals have been developed.

These devices may include sensors to detect the presence of a user. The device may then flush the toilet or urinal when the sensor no longer detects the presence of the user. When these sensors are directly attached to devices; they are exposed to possible vandalism or theft. Vandalism or theft reduces the cleanliness of the restroom and creates extra expense to repair or replace the device.

BRIEF SUMMARY

The present embodiment relates to in-wall sensor assemblies. The in-wall sensor assembly includes a housing with a circular flange, coupled to a side wall. The circular flange extends beyond the outer surface of the side wall. The in-wall sensor assembly also includes a fastener proximate to the outer surface of the side wall and a sensor located within the housing. The in-wall sensor assembly may also include a face plate removably attached to the housing and a power source coupled to the housing and the sensor.

A method for installing an in-wall sensor is also disclosed. The method includes inserting a housing into a hole in the wall. The housing may have a circular flange having a diameter larger than the diameter of the hole and a side wall attached to the circular flange. The side wall has a diameter that fits in the hole in the wall. The housing also includes a fastener attached to the outer surface of the side wall, and coupled to a tab. When the fastener is drawn towards the flange, the tabs move to a position substantially perpendicular to the housing and against an inner surface of the wall, locking the housing into place.

DESCRIPTION OF THE INVENTION

Figure 2:
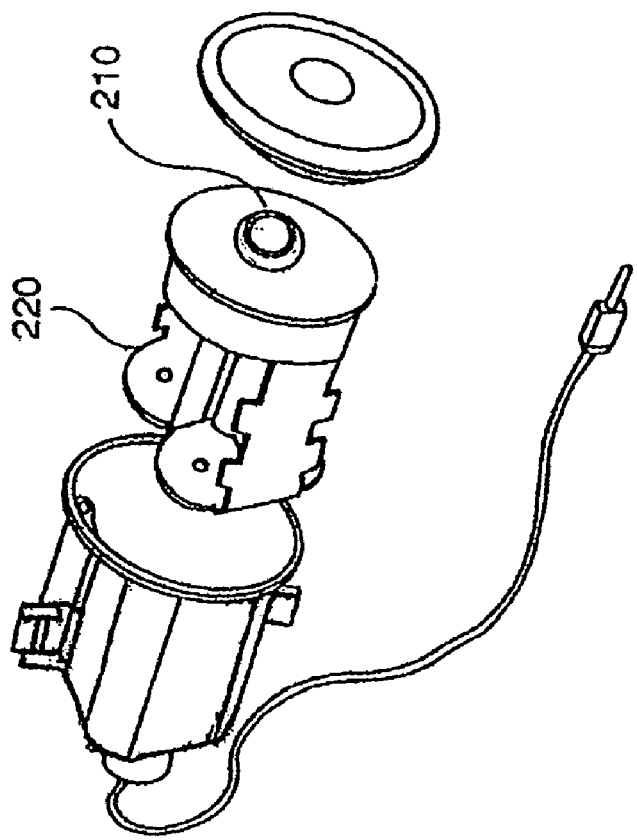
FIG. 2 is an exploded view of an embodiment.
Figure 1:
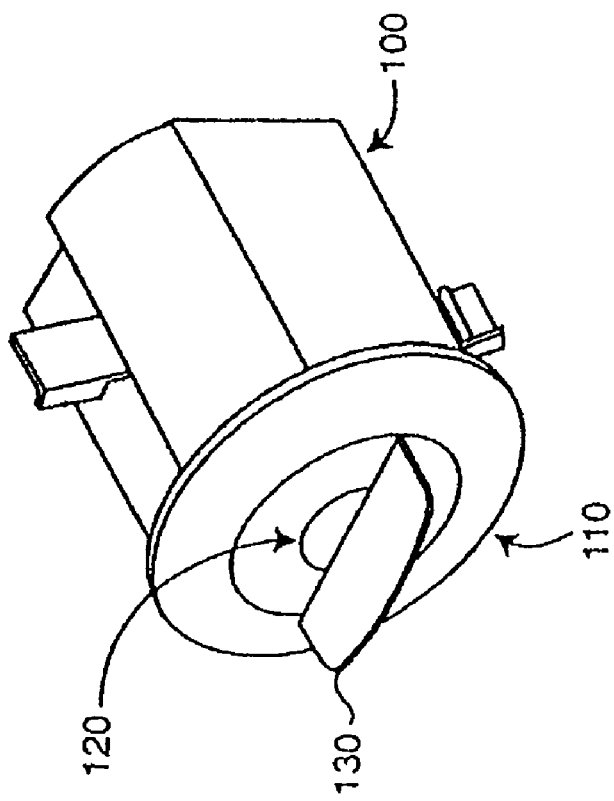
FIG. 1 is a perspective view of an embodiment.

FIGS. 1 and 2 present a generalized view of an in-wall sensor assembly. The assembly includes a housing 100, a removable face plate 110, and a removable key 130. The face plate 110 has a window 120 through which a sensor can function. The assembly further includes a power source 220 and a sensor element 210.

Figure 4:
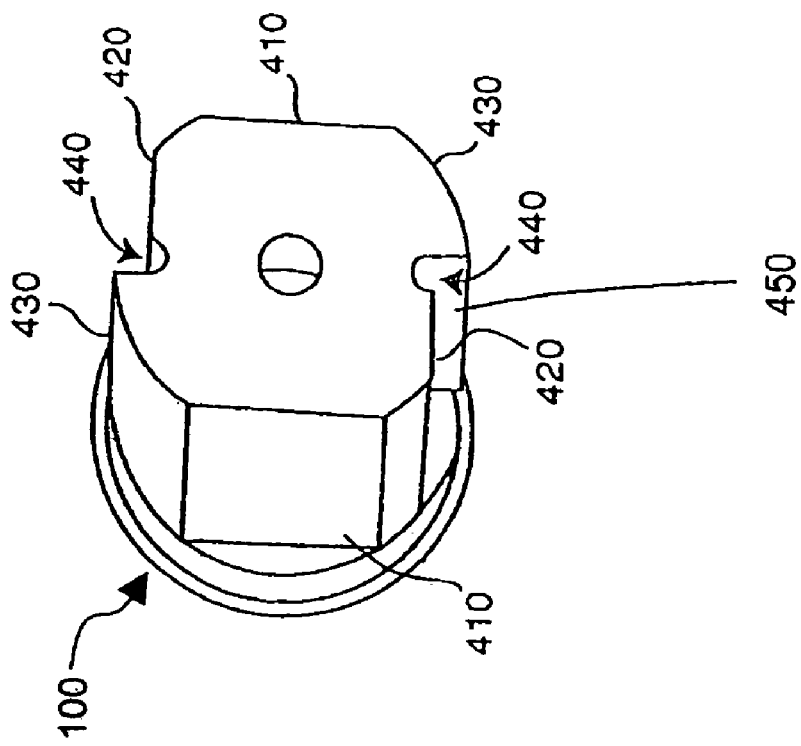
FIG. 4 is a perspective view of the rear of the housing.
Figure 3:
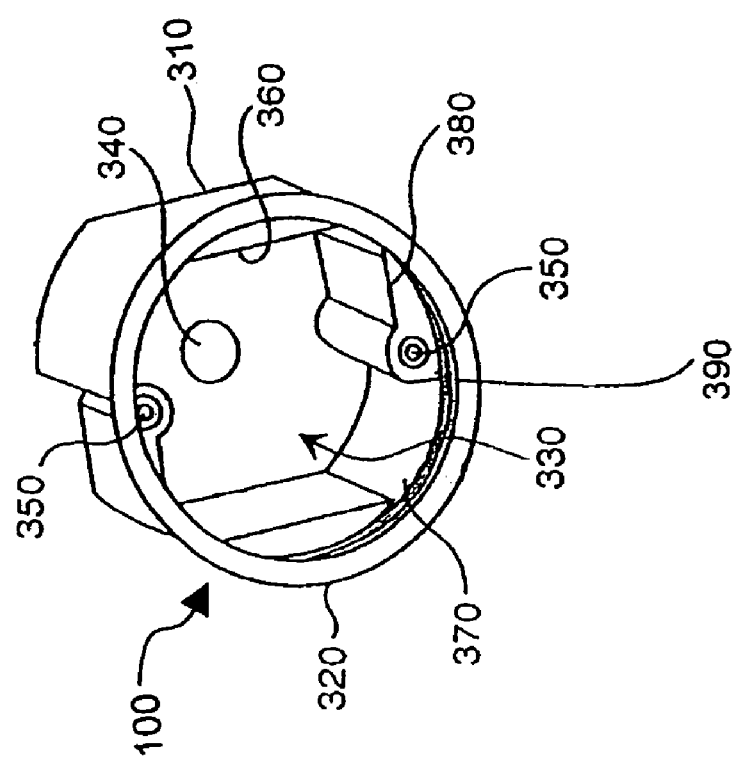
FIG. 3 is a perspective view of the front of the housing.

The housing 100 is shown in detail in FIGS. 3 and 4. The housing includes a body 310 having an open end 330 and a circular flange 320. As shown, the flange 320 has a diameter larger than the body 310. The housing 100 may be made of any sturdy material, but is preferably made of plastic or metal. In one embodiment, the housing 100 has a hole 340 in the end opposite the flange 320 to accommodate wires for electrical connections. However, the hole 340 may be placed anywhere in the housing. The inside of the housing may be generally square shaped, with two flat walls 360 parallel to each other, and the other two walls having a curved portion 370 and a flat portion 380. A hole 350 may be concentrically located within the curved portion 370. Additionally, the housing may contain threads 390 near the open end 330.

The body 310 may have any shape, including cylindrical, octagonal, or cubical. As shown in FIG. 4, the housing may be generally cubical, having two flat outside walls 410 parallel to each other. The other two side walls may have flat portions 420 and curved portions 430. Channels 440 may be disposed between the flat portions 420 and the curved portions 430. On one side of the channels 44, ridges 450 may be present. The channels may run the length of the body and terminate at the holes 350 (FIG. 3) near the front of the housing.

Figure 6:
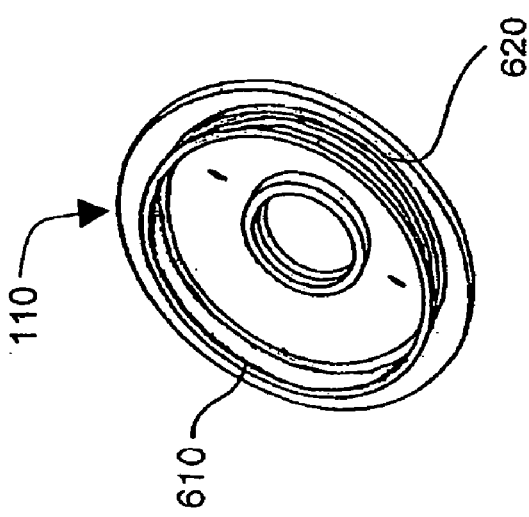
FIG. 6 is a perspective view of the rear of the cover plate.
Figure 5:
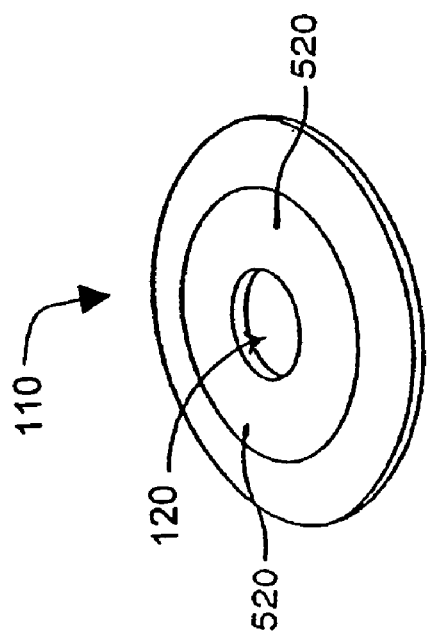
FIG. 5 is a perspective view of the front of the cover plate.

A face plate 110 is shown in FIGS. 5 and 6. The face plate may be disk-shaped, with a circular opening 510 in the center. In one embodiment, a window 120 may be positioned within the circular opening 510. Two indentations or openings 520 may be positioned in the outer surface of the face plate 110 to assist in the attachment of the face plate 110 to the housing 100 (FIG. 1). The inside of the face plate is depicted in FIG. 6. The face plate may have an inner ridge 610 contains threading on the outside, which matches the threaded portion 390 (FIG. 3) of the body. The face plate may be made from a durable material, preferably metal, most preferably stainless steel.

Figure 7:
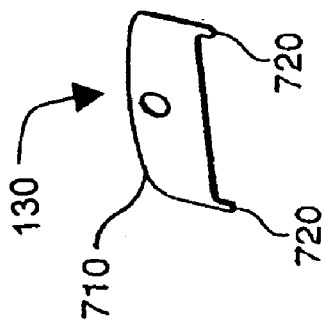
FIG. 7 is a side view of the key.

The face plate 110 (FIG. 1) may be secured to the body 100 through the use of a key 130 (FIG. 1), which is shown in FIG. 7. The key has a handle 710 and two projections 720. The projections 720 match up with the indentations 520 (FIG. 5) of the face plate 110.

Figure 8:
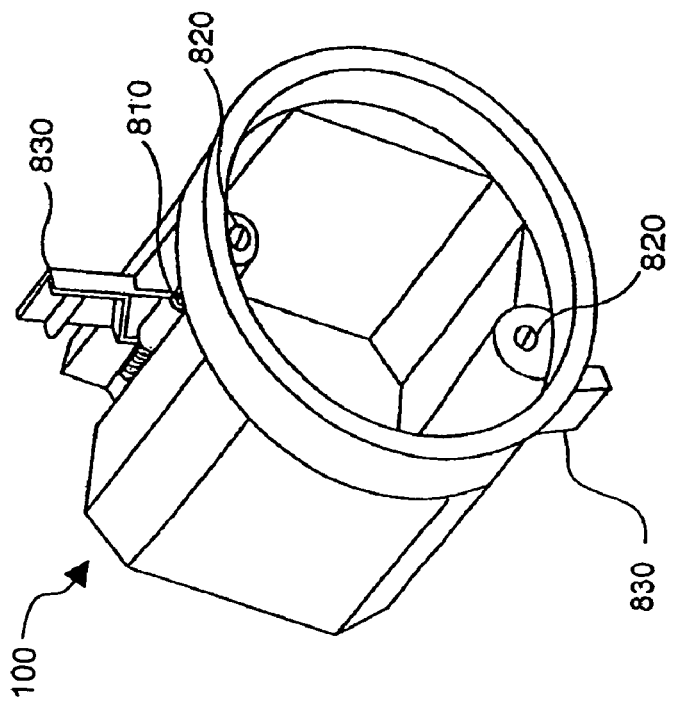
FIG. 8 is a perspective view of the housing showing the fastener.

As shown in FIG. 8, screws 810 may be positioned in the channels 440 (FIG. 4) of the housing 100 (FIG. 1). The heads 820 of the screws 810 are located in the holes 350 (FIG. 3). A tab 830 contains threading that corresponds to the threading of the screw 810. Therefore, the tab 830 may be threaded onto the screw 810.

Figure 9:
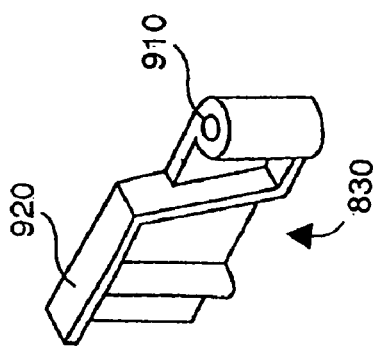
FIG. 9 is a perspective view of the retaining tab.

FIG. 9 depicts the tab 830. The tab may include a cylindrical channel 910 that is threaded to fit around a screw 810 (FIG. 8). Attached to the cylindrical channel 910 is a flap 920. The tab may be made of durable material including, but not limited to metal, plastic, or a composite material.

Figure 10:
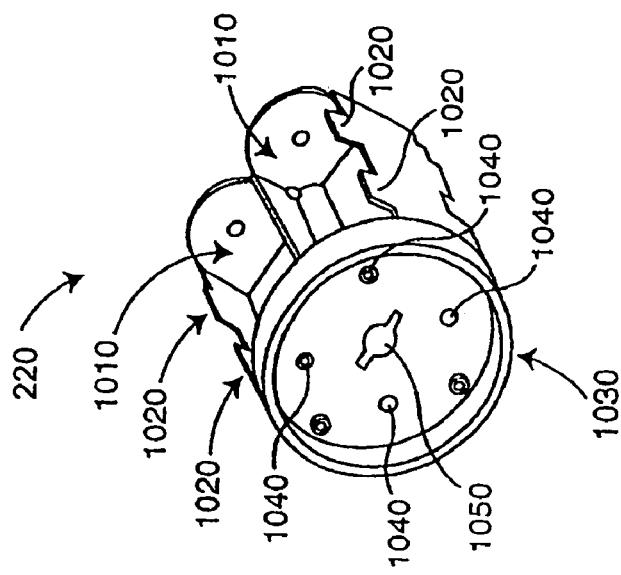
FIG. 10 is a perspective view of the battery pack.

Within the housing 100 (FIG. 1) is a power source 220 (FIG. 2), which is depicted in FIG. 10. The power source may be a battery pack 1000 to hold one or more replaceable batteries, which would be located within the battery pack 1000. The battery pack 1000 may have one or more chambers 1010 to hold one or more batteries. The battery pack 1000 may be modified for different sizes and numbers of batteries. The present battery pack 1000 has four chambers 1010 to hold four batteries of a type, preferably AA or C size 1.5 volt batteries. Each chamber 1010 may have one or more clasps 1020 to help secure the battery in place. At one end 1030 of the battery pack 1000, a plurality of holes 1040 may be present to allow physical attachment of the sensing means to the battery pack. An additional opening 1050 may be present to allow an electrical connection between the sensor and the power source.

Figure 11:
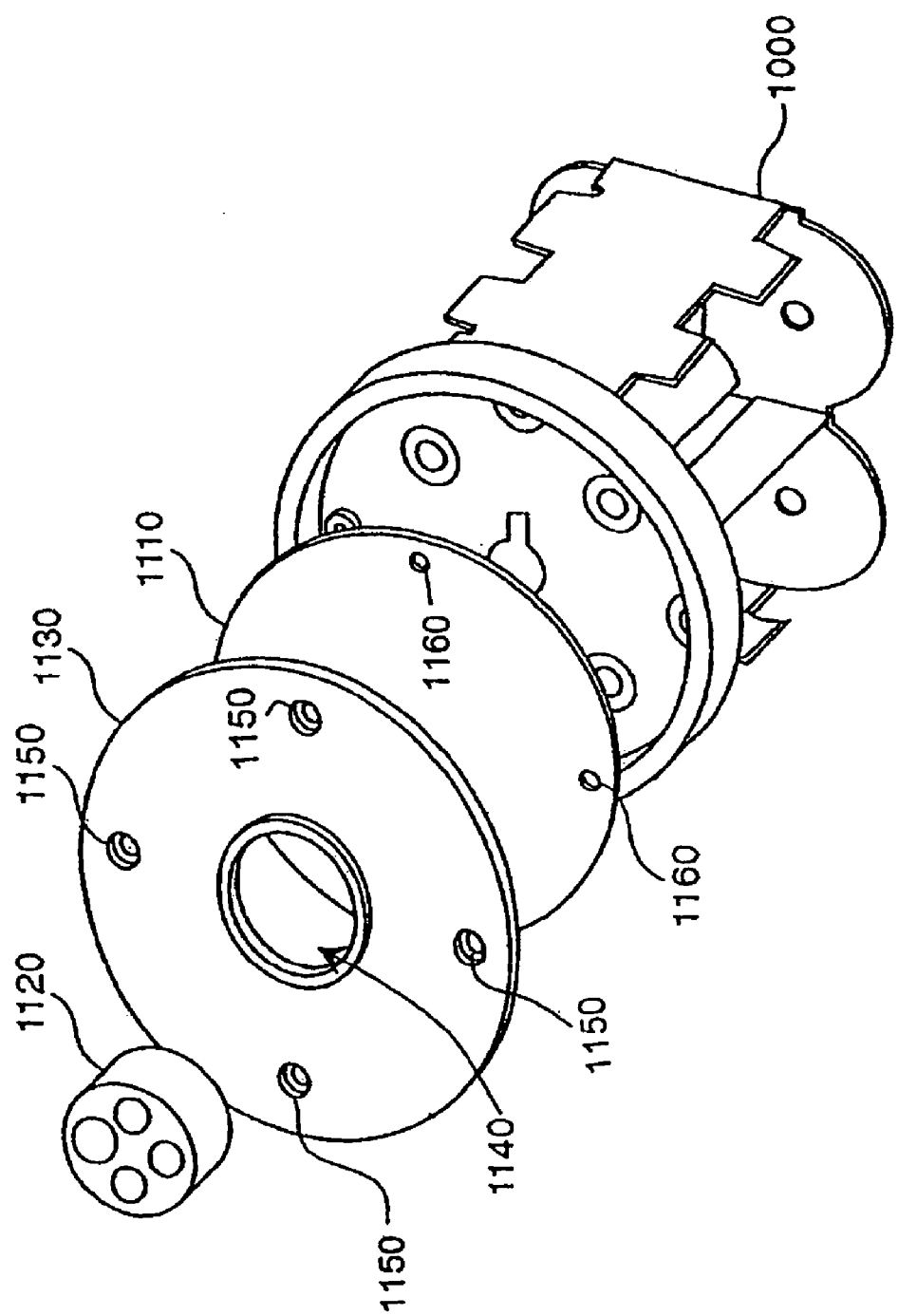
FIG. 11 is an exploded view of battery pack and the sensor.

As depicted in FIG. 11, a printed circuit board (PCB) 1110 may be connected to the battery pack 1000. The PCB 1110 contains the electronic circuitry necessary to operate the sensor. The PCB 1110 may be electrically connected to the power source and to a sensor block 1120. The PCB 1110 may be protected by the PCB cover 1130. The PCB cover 1130 may have an opening 1140 in the center to allow for placement of the sensor block 1120. The PCB cover 1130 may be secured to the battery pack 1000 by at least one fastener, such as a screw, through PCB cover holes 1150 and PCB holes 1160. The sensor block 1120 may be connected to the PCB 1110 and contains sensing element which senses the presence of an object or occurrence at some distance from the sensor. The sensor may be based on motion, infra-red, body heat, or any basis that converts non-electrical energy into electrical or optical energy.

During insertion of the housing 100 (FIG. 1) into the wall, the tabs 830 are positioned parallel to the housing body 310 (FIG. 3) adjacent to the flat portion 420 (FIG. 4). After insertion of the housing 100 (FIG. 1) into the wall, the screws 810 are tightened. The turning rotates the tabs 830 into a position generally perpendicular to the housing body 310 (FIG. 3). Ridges 450 (FIG. 4) keeps the tabs 830 in a perpendicular position. Additional turning of the screws 810 forces the tabs 830 towards the flange 320 (FIG. 3). Eventually, the assembly is secured to the wall by the wall being snuggly located between the flange 320 (FIG. 3) and the tabs 830.

Once the housing is securely situated in the wall, the power source 220 (FIG. 2), which may include batteries, as well as the sensor and PCB 1110 (FIG. 11) may be situated inside the housing. Furthermore, the face plate 130 (FIG. 1) may be attached to the housing 100 (FIG. 1) by placing the projections 720 (FIG. 7) of the key 130 (FIG. 1) into the indentations 520 (FIG. 5) of the face plate 110 (FIG. 1) and turning the key 130 (FIG. 1) in a clockwise direction, thereby turning the face plate 110 (FIG. 1) engaging the threading 390 (FIG. 3) of the housing and the threading 620 (FIG. 6) of the face plate. Once the face plate 110 (FIG. 1) is secured on the housing 100 (FIG. 1), the key 130 (FIG. 1) can be removed from the face plate 110 (FIG. 1), making the face plate 110 (FIG. 1) difficult to remove. The face plate may be removed from the housing 100 (FIG. 1) by again inserting the projections 720 (FIG. 7) of the key 130 (FIG. 1) into the indentations 520 (FIG. 5) and turning the key 130 (FIG. 1) and face plate 110 (FIG. 1) in a counter-clockwise direction. Turning the face plate 110 (FIG. 1) in a counter-clockwise direction will disengage the threading 620 (FIG. 6) of the faceplate 110 (FIG. 1) from the threading 390 (FIG. 3) of the housing 100 (FIG. 1).

The in wall sensor may be used for controlling the flush valve on a urinal or toilet, including both tank and non-tank style toilets. When used in tandem with a flush valve, the in wall sensor may send an electrical signal through an electrical connection a wireless electromagnetic signal, such as an infrared signal, to the flush valve. In operation, the sensor detects the presence of a user or a specified condition and sends an activation signal to the sensing logic or electronics mounted on the printed circuit board in the housing. Alternatively, the sensor may provide an activation signal when a user departs from a field of view, when a light is turned on, after an elapsed time period, or some other condition.

Figure 12:
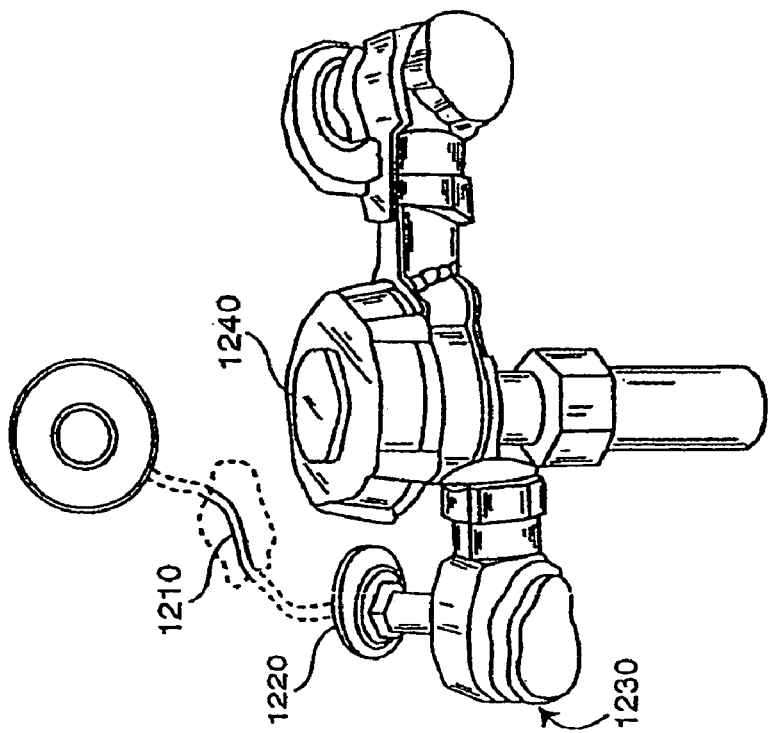
FIG. 12 is a perspective view of the sensor attached to a non-tank-style toilet.

As shown in FIG. 12, an in-wall sensor unit may electronically connect to the flush valve of a non-tank style toilet. The electrical connection may be a wire 1210. The wire 1210 may run out of the back of the housing 100 (FIG. 1), behind the wall, and out of the wall through an escutcheon 1220 to connect to the flush valve actuation apparatus. The flush handle actuation apparatus may include a modular housing unit 1230. The housing unit 1230 is adapted to be easily mounted to flushing mechanism housing 1240.

Figure 13:
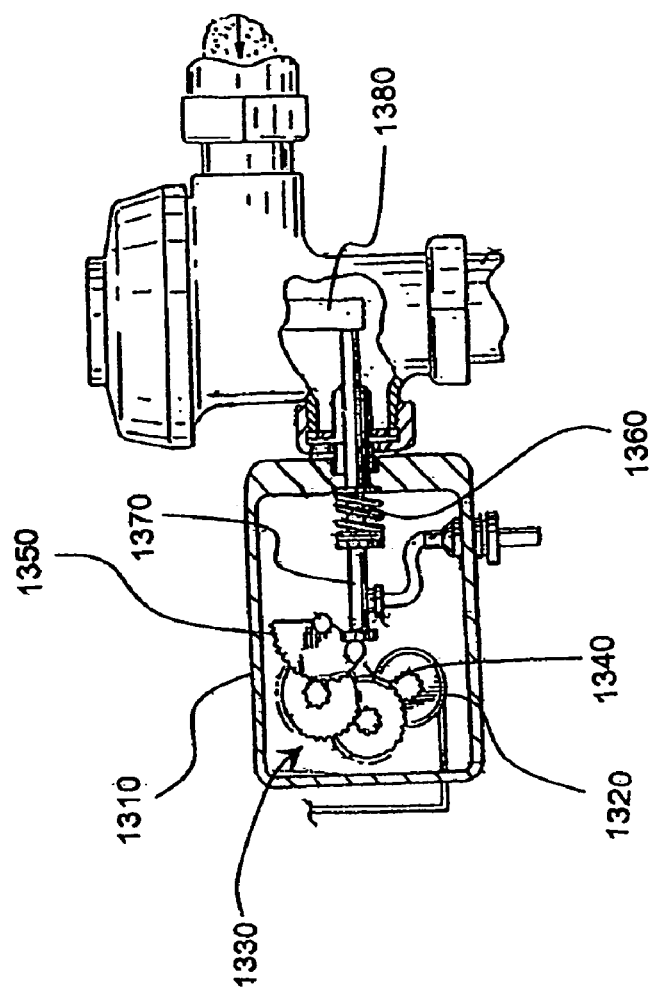
FIG. 13 is a cut-away perspective of an automatic flush valve apparatus.

The mechanics of the actuation device are shown in FIG. 13. A modular housing unit 1310 may contain a motor 1320, which may be mounted to the housing unit 1310. The motor 1320 may be mechanically connected through a reduction gear train 1330 to an actuating element 1340 which is mounted on a gear 1350 of reduction gear train 1330. As motor 1320 is activated, reduction gear train 1330 partially rotates gear 1350 in a counter-clockwise direction. Therefore, actuating element 1340 moves to the right, pushing against plunger pin 1370. Plunger pin 1370 then moves against the stem of the valve 1380. As the stem 1380 tilts, it activates the flushing mechanism (not shown). The motor 1320 is then deactivated, and a spring 1360 forces the actuating element 1340 and gear back to their original position.

Figure 14:
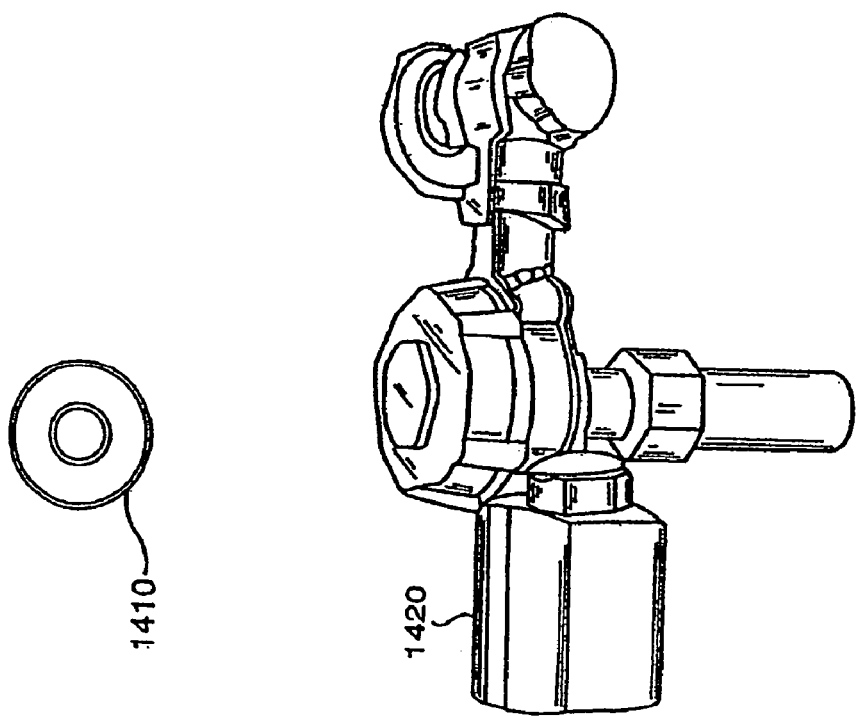
FIG. 14 is a perspective view of the sensor wired to a non-tank style valve.

Alternatively, the in-wall sensor may send a signal to the flush valve by means of an electromagnetic signal, as depicted in FIG. 14. When the sensor assembly 1410 detects the presence of a user or a specified condition, a transmitter (not shown) in the in-wall sensor assembly 1410 sends an activation signal to a receiver (not shown) in the flushing mechanism housing 1420. The receiver then activates an actuation device, similar to the one depicted in FIG. 13, which then activates the flushing mechanism.

Figure 15:
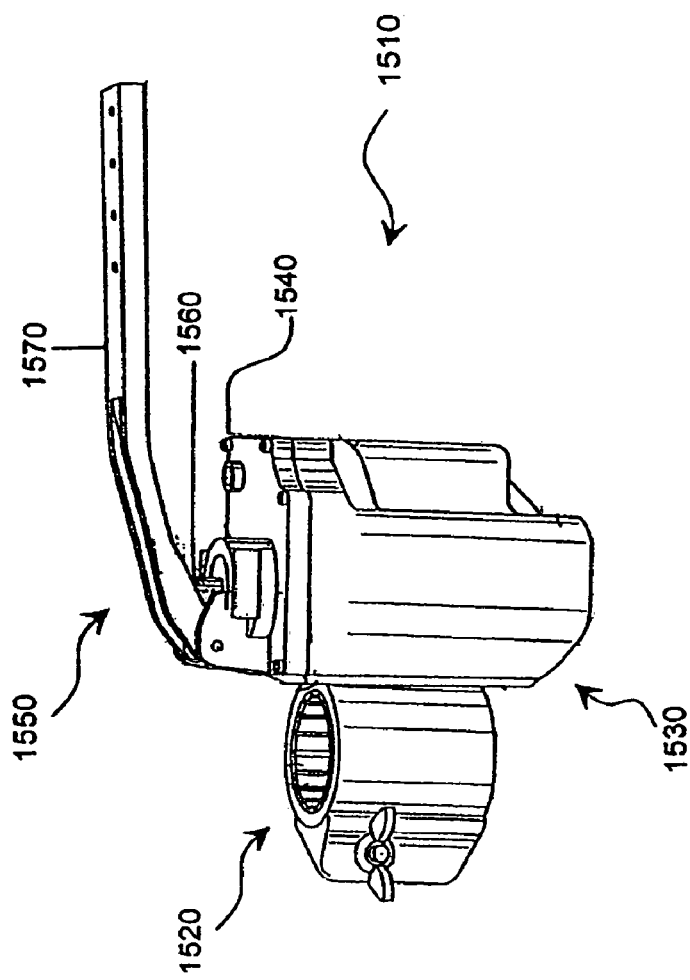
FIG. 15 is a perspective view of the sensor and a tank style valve.

The in wall sensor can also operate with a flush valve for a tank style toilet. The in wall sensor sends a signal, either through an electrical connection or a wireless signal, to the flush valve. As illustrated in FIG. 15, the automatic flushing actuator for tank style toilets may include a housing 1510 and a mounting clamp 1520, which are adapted to be placed inside the tank of a toilet and secured to the overflow pipe (not shown). The housing 1510 comprises a lower portion or base 1530 and an upper portion or cover 1540 having a dual part lever assembly 1550 mounted thereon. Activation of a motor (not shown) occurs when the sensor assembly (not shown) transmits an electrical signal or an electromagnetic signal to a receiver in a circuit board (not shown) in the housing. The motor in turn activates a gear reduction mechanism (not shown) and causes gears and a cam (not shown) mounted thereon to rotate. The gear having the cam mounted thereon rotates through one complete revolution for each flush cycle. As a result of activation, the cam pushes an actuator rod 1560 in an upward direction. The actuator rod 1560 then pushes on a lever 1570 causing lever 1570 to rise in an upward direction. As the lever 1570 is raised, a chain (not shown) attached to the lever 1570 is placed under tension causing the valve flap lid (not shown) to be lifted off of the flush valve (not shown), thereby flushing the toilet.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except as necessitated by the accompanying claims and their equivalents.

The invention claimed is:

1. An in-wall sensor assembly comprising:
    a housing comprising
        a flange, wherein said flange is substantially circular; and
        a side wall attached to said flange, said side wall comprising an inner surface and an outer surface, wherein said flange extends radially outward beyond said outer surface of said side wall;
    a fastening in physical communication with to said outer surface of said side wall;
    a sensor located within said housing;
    a face plate removably attached to said housing, wherein an inner diameter of said flange of said housing is threaded and said face plate is threaded, such that said face plate may be screwed on to said housing; and
    an electrical power source electrically connected to said sensor.

2. The in-wall sensor assembly of claim 1, wherein said electrical power source is located within said housing.

3. The in-wall sensor assembly of claim 2, wherein said electrical power source is at least one battery.

4. The in-wall sensor assembly of claim 1, where said face plate further comprises at least one indentation that corresponds to a key, such that said face plate may be removably attached to said housing by use of said key.

5. The in-wall sensor assembly of claim 1, where said fastening comprises at least one screw attached to said housing, and at least one tab attached to said at least one screw, wherein when said at least one screw is turned, said at least one tab rotates to a position perpendicular to said housing, and said at least one tab secures said housing to a wall.

6. The in-wall sensor assembly of claim 1, wherein said sensor utilizes a electromagnetic signal.

7. The in-wall sensor assembly of claim 1, further comprising a circuit board electrically connected to said sensing means and said electrical power source.

8. An in-wall sensor assembly comprising:
    a housing comprising
        a flange,
        an inner surface,
        an outer surface, and
        at least one channel in said outer surface;
    at least one screw in physical communication with said at least one channel in said housing;
    at least one tab positioned on said at least one screw, said at least one tab extending from said outer surface of said side wall, said at least one tab acting to hold said assembly within a wall;
    a sensor located within said housing;
    at least one battery within said housing for powering said sensor;
    a battery pack within said housing for holding said at least one battery; and
    a face plate removably attached to said housing, said face plate including an indentation that corresponds to a key, such that said face plate may be removably attached to said housing by use of said key.

9. The in-wall sensor assembly of claim 8, wherein said flange is circular.

10. The in-wall sensor assembly of claim 9, wherein said circular flange of said housing is threaded and said face plate is threaded, such that said face plate may be screwed onto said housing.

11. The in-wall sensor assembly of claim 8, wherein said battery pack further comprises:
    at least one chamber adapted to holding said at least one battery;
    at least one clasp adapted to securing said at least one battery in place in said at least one chamber; and
    an electrical connection connecting said at least one battery to said sensor.

12. The in-wall sensor assembly of claim 8, wherein said sensor is an infrared sensor.

13. The in-wall sensor assembly of claim 8, further comprising a circuit board electrically connected to said sensor and said at least one battery.

14. The in-wall sensor assembly of claim 8, wherein said in-wall sensor assembly is connected to a flush valve.

15. An in-wall sensor assembly comprising:
    a housing comprising
        a flange; and
        a side wall attached to said flange, said side wall comprising an inner surface and an outer surface, wherein said flange extends radially outward beyond said outer surface of said side wall;
    a fastening in physical communication with to said outer surface of said side wall;
    a sensor located within said housing;
    a face plate removably attached to said housing, said face plate including at least one indentation that corresponds to a key, such that said face plate may be removably attached to said housing by use of said key; and
    an electrical power source electrically connected to said sensor.

16. The in-wall sensor assembly of claim 15, wherein said electrical power source is located within said housing.

17. The in-wall sensor assembly of claim 16, wherein said electrical power source is at least one battery.

18. The in-wall sensor assembly of claim 15 wherein said flange is substantially circular.

19. The in-wall sensor assembly of claim 18, wherein an inner diameter of said flange of said housing is threaded and said face plate is threaded, such that said face plate may be screwed on to said housing.

20. The in-wall sensor assembly of claim 15, where said fastening comprises at least one screw attached to said housing, and at least one tab attached to said at least one screw, wherein when said at least one screw is turned, said at least one tab rotates to a position perpendicular to said housing, and said at least one tab secures said housing to a wall.

21. The in-wall sensor assembly of claim 15, wherein said sensor utilizes a electromagnetic signal.

22. The in-wall sensor assembly of claim 15, further comprising a circuit board electrically connected to said sensing means and said electrical power source.

* * * * *